(12) United States Patent
Chen

(10) Patent No.: US 11,068,036 B2
(45) Date of Patent: *Jul. 20, 2021

(54) PORTABLE ELECTRONIC DEVICE AND CONTROL METHOD THEREOF

(71) Applicant: PEGATRON CORPORATION, Taipei (TW)

(72) Inventor: Shih-Hao Chen, Taipei (TW)

(73) Assignee: PEGATRON CORPORATION, Taipei City (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/859,014

(22) Filed: Apr. 27, 2020

(65) Prior Publication Data

US 2020/0257344 A1 Aug. 13, 2020

Related U.S. Application Data

(63) Continuation of application No. 15/476,689, filed on Mar. 31, 2017, now Pat. No. 10,698,462.

(30) Foreign Application Priority Data

Apr. 29, 2016 (TW) .................... 105113416

(51) Int. Cl.
| | | |
|---|---|---|
| G06F 1/26 | (2006.01) | |
| G06F 1/32 | (2019.01) | |
| G06F 1/16 | (2006.01) | |
| H04M 1/72454 | (2021.01) | |
| H04M 1/72463 | (2021.01) | |
| H04M 1/02 | (2006.01) | |
| H04M 1/04 | (2006.01) | |
| G06F 1/3206 | (2019.01) | |
| G06F 1/3231 | (2019.01) | |

(52) U.S. Cl.
CPC ............ *G06F 1/26* (2013.01); *G06F 1/1694* (2013.01); *G06F 1/3206* (2013.01); *G06F 1/3231* (2013.01); *H04M 1/72454* (2021.01); *H04M 1/72463* (2021.01); *H04M 1/0214* (2013.01); *H04M 1/04* (2013.01); *H04M 2250/12* (2013.01); *Y02D 10/00* (2018.01)

(58) Field of Classification Search
CPC ........ G06F 1/26; G06F 1/1694; G06F 1/3206; G06F 1/3231; H04M 1/72569; H04M 1/72577
See application file for complete search history.

(56) References Cited

U.S. PATENT DOCUMENTS

| | | | | |
|---|---|---|---|---|
| 9,009,516 B1* | 4/2015 | Gabayan | ............... | G06F 1/3206 713/323 |
| 9,037,199 B1* | 5/2015 | Stogaitis | ............... | A61B 5/1116 455/574 |
| 2007/0213045 A1* | 9/2007 | Hermansson | ......... | G06F 1/1613 455/425 |

(Continued)

*Primary Examiner* — Jaweed A Abbaszadeh
*Assistant Examiner* — Cheri L Harrington
(74) *Attorney, Agent, or Firm* — J.C. Patents

(57) ABSTRACT

A control method of a portable electronic device (PED) includes following steps. A trigger event is received. Next, an accelerator detects a first behavior of the PED and produces a first signal. If the first signal satisfies a first preset condition, the accelerator detects a second behavior of the PED and produces a second signal. If the second signal satisfies a second preset condition, the PED performs an action.

20 Claims, 6 Drawing Sheets

(56) References Cited

U.S. PATENT DOCUMENTS

| | | | | |
|---|---|---|---|---|
| 2008/0280642 A1* | 11/2008 | Coxhill | ............... | G06F 1/1694 |
| | | | | 455/556.1 |
| 2012/0254646 A1* | 10/2012 | Lin | ............... | G06F 1/3206 |
| | | | | 713/323 |
| 2013/0212416 A1* | 8/2013 | Crisan | ............... | G06F 1/3215 |
| | | | | 713/323 |
| 2013/0234924 A1* | 9/2013 | Janefalkar | ............... | G06F 3/011 |
| | | | | 345/156 |
| 2014/0120894 A1* | 5/2014 | Lee | ............... | H04M 1/72519 |
| | | | | 455/418 |
| 2014/0232642 A1* | 8/2014 | Lefebvre | ............... | G06F 1/1694 |
| | | | | 345/156 |
| 2015/0192954 A1* | 7/2015 | Kang | ............... | G06F 1/3206 |
| | | | | 713/100 |
| 2015/0193232 A1* | 7/2015 | Keal | ............... | G06F 1/1694 |
| | | | | 702/150 |
| 2015/0276792 A1* | 10/2015 | Sato | ............... | G06F 1/1626 |
| | | | | 345/156 |
| 2015/0286285 A1* | 10/2015 | Pantelopoulos | ............... | G01C 22/006 |
| | | | | 345/156 |
| 2016/0018872 A1* | 1/2016 | Tu | ............... | G06F 1/3234 |
| | | | | 345/173 |
| 2016/0170557 A1* | 6/2016 | Dorsch | ............... | G06F 3/0416 |
| | | | | 345/173 |
| 2019/0107550 A1* | 4/2019 | Kashiwagi | ............... | G06F 1/1684 |

\* cited by examiner

US 11,068,036 B2

PORTABLE ELECTRONIC DEVICE AND CONTROL METHOD THEREOF

CROSS-REFERENCE TO RELATED APPLICATION

This application is a continuation application of and claims the priority benefit of U.S. application Ser. No. 15/476,689, filed on Mar. 31, 2017, now allowed, which claims the priority benefit of Taiwan application serial no. 105113416, filed on Apr. 29, 2016. The entirety of each of the above-mentioned patent applications is hereby incorporated by reference herein and made a part of this specification.

FIELD OF THE INVENTION

The invention relates to a portable electronic device (PED), and more particularly, relates to a PED and a control method thereof.

DESCRIPTION OF RELATED ART

Smartphones, tablet computers, e-books, or other similar portable electronic devices (PEDs) have become necessary equipment for people in modern days with fast-paced and busy lives. Generally speaking, a power turning-on/off function, a software turning-on/off function, a mechanism turning-on/off function, or other turning-on/off function functions, as well as a volume switching function, a screen switching function, a software program switching function, or other switching functions of the PED usually require an user to operate on a physical button or a virtual button so as to execute the switch function or the switching function, and it can be seen that operation steps are relatively complicated. In view of the foregoing, how to perform the switch function or the switching function more rapidly through an accelerator configured on the PED along with corresponding determination mechanisms to facilitate operation for a user has become an issue to be solved by major manufacturers.

SUMMARY OF THE INVENTION

The invention provides a portable electronic device (PED) and a control method of the PED for facilitating operation for a user.

In an embodiment of the invention, a control method of a PED is provided, and the control method includes following steps. A trigger event is received. A first behavior of the PED is detected by an accelerator and a first signal is produced. A second behavior of the PED is detected by the accelerator if the first signal satisfies a first preset condition, and a second signal is produced. An action is performed by the PED if an operation controller determines the second signal satisfies a second preset condition.

In an embodiment of the invention, the trigger event includes a displacement of the PED, and a change amount of an acceleration component or the change amount of a sum of the acceleration component in a three-dimensional coordinate detected by the accelerator is greater than or equal to a default threshold value.

In an embodiment of the invention, the PED includes a trigger element. The trigger event includes triggering the trigger element.

In an embodiment of the invention, after the second signal is determined to satisfy the second preset condition, the control method of the PED further includes following steps. An included angle between the PED and a Z-axis of a three-dimensional space is detected by the accelerator, and a third signal is produced. An action is performed by the PED if the third signal falls within a default angle range.

In an embodiment of the invention, the first behavior refers to the PED being touched, and the second behavior refers to the PED in a static state.

In an embodiment of the invention, the first signal and the second signal respectively include a pulse signal converted according to a variation of an acceleration component or a variation of a sum of the acceleration component in a three-dimensional coordinate as detected by the accelerator.

In an embodiment of the invention, the first preset condition includes a first threshold value, a second threshold value, and a time cycle, the second threshold value is greater than the first threshold value, and when a time period during which, on a horizontal basis, the pulse signal of the first signal ascends to and exceeds the first threshold value and the second threshold value and descends to the first threshold value satisfies the time cycle, the first signal satisfies the first preset condition.

In an embodiment of the invention, the second preset condition includes a lower limit value and an upper limit value, and when the pulse signal of the second signal oscillates back and forth between the lower limit value and the upper limit value, or the number of times of the pulse signal exceeding the lower limit value and the upper limit value falls within a predetermined number of times, the second signal satisfies the second preset condition.

In an embodiment of the invention, the action includes turning on or off a mechanism.

In another embodiment of the invention, the action includes turning on or off a power source, a software program, a volume, or a screen or switching between the power source, the software program, the volume, and the screen.

In an embodiment of the invention, a portable electronic device (PED) is provided, and the PED includes a body, an accelerator, and an operation controller. The accelerator is disposed at the body and configured to detect a first behavior and a second behavior of the body, so as to produce a first signal and a second signal, respectively. The operation controller is disposed at the body and electrically coupled to the accelerator. The operation controller is awaken by a trigger event to receive the first signal and the second signal, and if the operation controller determines the first signal satisfies a first preset condition and the second signal satisfies a second preset condition, then the PED performs a turning-on/off action.

In an embodiment of the invention, the PED further includes a trigger element disposed at one side of the body. The trigger element is electrically coupled to the operation controller, and the trigger event includes triggering the trigger element.

In an embodiment of the invention, the PED further includes a support stand and a position-limiting element. The support stand is movably connected to the body. The position-limiting element is disposed at the body and corresponding to the support stand, and the position-limiting element is engaged with the support stand, such that the support stand is stored at the body. The turning-on/off function includes separating the position-limiting element from the support stand, such that the support stand is unfolded against the body.

In an embodiment of the invention, a material of the position-limiting element comprises a memory alloy and the position-limiting element is electrically coupled to the operation controller. When a turning-on/off function is performed by the PED, the operation controller electrifies the position-limiting element, such that the position-limiting element is deformed and separated from the support stand.

In view of the foregoing, the PED provided by an embodiment of the invention is equipped with the operation controller and the accelerator, while the accelerator detects the behavior or the status of the PED, and the operation controller sets up a determination mechanism or model. Thereby, after the operation controller determines the signal detected by the accelerator satisfies the preset condition, the PED is enabled to immediately perform the power source turning-on/off function, the software program turning-on/off function, the mechanism turning on/off function, or other turning-on/off functions or perform the volume switching function, the screen switching function, the software program switching function, or other switching functions. In other words, the PED and the control method provided by an embodiment of the invention allow a user to perform the turning-on/off function or the switching function more rapidly with no need to operate on any physical button or any virtual button, and operation is facilitated as a result.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1A:
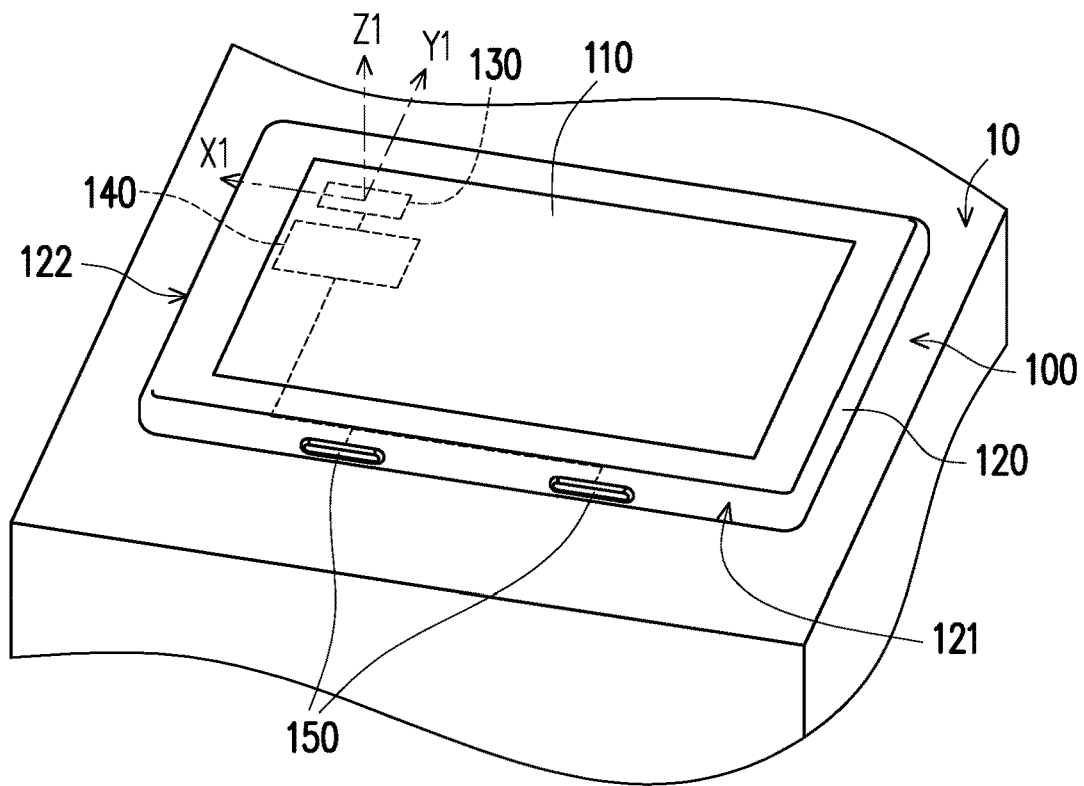
FIG. 1A and FIG. 1B are schematic diagrams respectively illustrating a usage situation of a portable electronic device (PED) according to an embodiment of the invention.
Figure 1B:
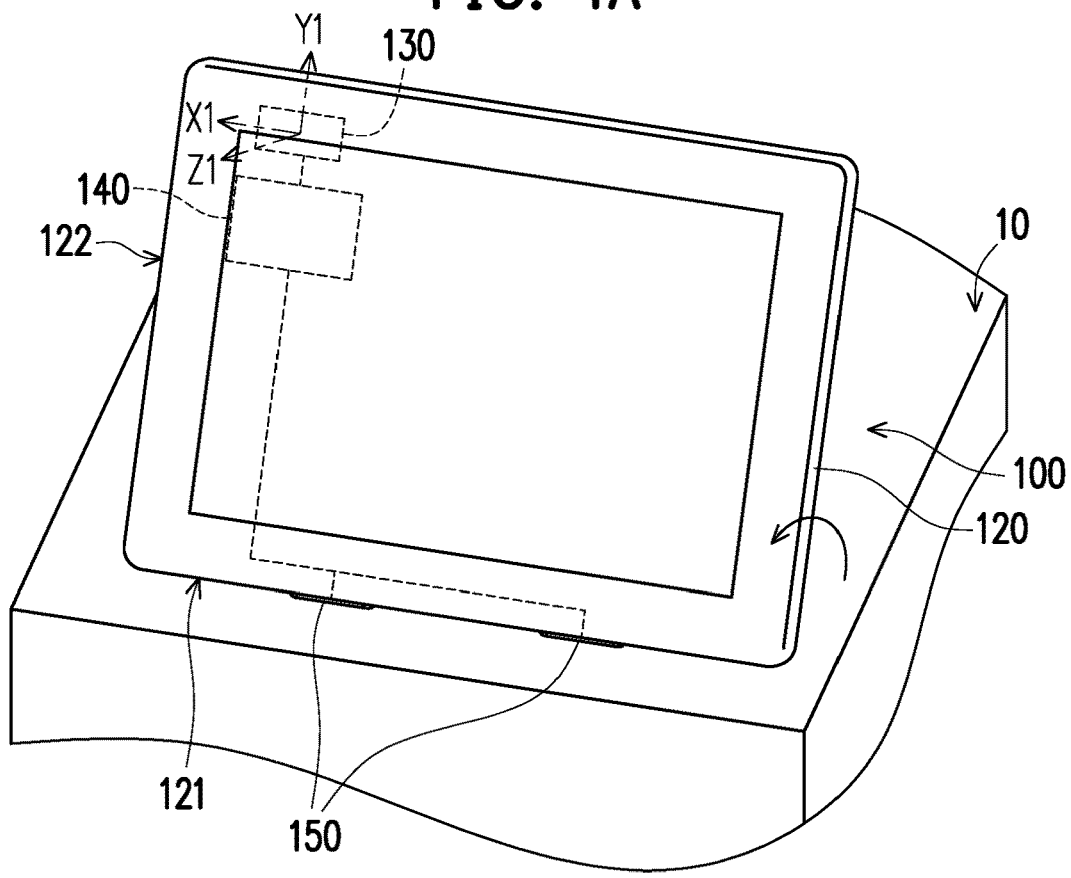

FIG. 1A and FIG. 1B are schematic diagrams respectively illustrating a usage situation of a portable electronic device (PED) according to an embodiment of the invention. Referring to FIG. 1A and FIG. 1B, a PED 100 is exemplified as a tablet computer in the embodiment, but the invention is not limited thereto, and the PED 100 may also be a smartphone, an e-book, a navigation device, or an electronic display. The PED 100 includes a display panel 110, a body 120, an accelerator 130, and an operation controller 140, wherein the display panel 110 is assembled to the body 120, and the accelerator 130 and the operation controller 140 are both disposed at the body 120.

More specifically, the accelerator 130 and the operation controller 140 are, for example, disposed between the display panel 110 and the body 120. The accelerator 130 may be configured to detect the first behavior and the second behavior of the body 120, so as to produce the first signal and the second signal, respectively. The operation controller 140 is electrically coupled to the accelerator 130 and suitable for being awakened by a trigger event to receive the first signal and the second signal. If the operation controller 140 determines the first signal satisfies the first preset condition and the second signal satisfies the second preset condition, the PED 100 performs an action (i.e., a turning-on/off function or a switching function). A process of determining a behavior or a status of the PED 100 to perform the turning-on/off function or the switching function is described in detail below.

The accelerator 130 may be a gravity sensor, such as a G sensor, configured to detect a physical quantity of movement of the PED 100, and the physical quantity of movement includes a displacement, a speed, an acceleration, a tilt angle values, and etc. The operation controller 140 may be a central processing unit (CPU) having a control unit, an arithmetic and logic unit, a register, or a memory unit therein, and the operation controller 140 is configured to receive and send a signal, perform calculation on the signal, compare, determine, or temperately store data. The PED 100 illustrated in FIG. 1A is placed horizontally on a working plane 10, wherein the bottom of the body 120 is horizontally attached to the working plane 10, and the display panel 110 faces upward. On the other hand, a Z1-axis of the accelerator 130 is perpendicular to the working plane 10, a X1-axis of the accelerator 130 is parallel to the long side 121 of the body 120, and a Y1-axis of the accelerator 130 is parallel to the short side 122 of the body 120. At the same time, an acceleration component (referred to as Zg hereinafter and affected by gravity) on the Z1-axis is equal to 1 g, while an acceleration component (referred to as Xg hereinafter) on the X1-axis and an acceleration component (referred to as Yg hereinafter) on the Y1-axis are respectively equal to 0. Next, as illustrated in FIG. 1B, the PED 100 is moved, such that the body 120 is no longer attached horizontally to the working plane 10, and the long side 121 of the body 120 is parallel to or horizontally attached to the working plane 10. At the same time, a tilt angles are formed between the working plane 10 and the Y1-axis and between the working plane 10 and the Z1-axis. Therefore, at the moment when the PED 100 is moved, the Yg or the Zg is greater than 1 g, and the Xg is still substantially equal to 0.

Figure 2:
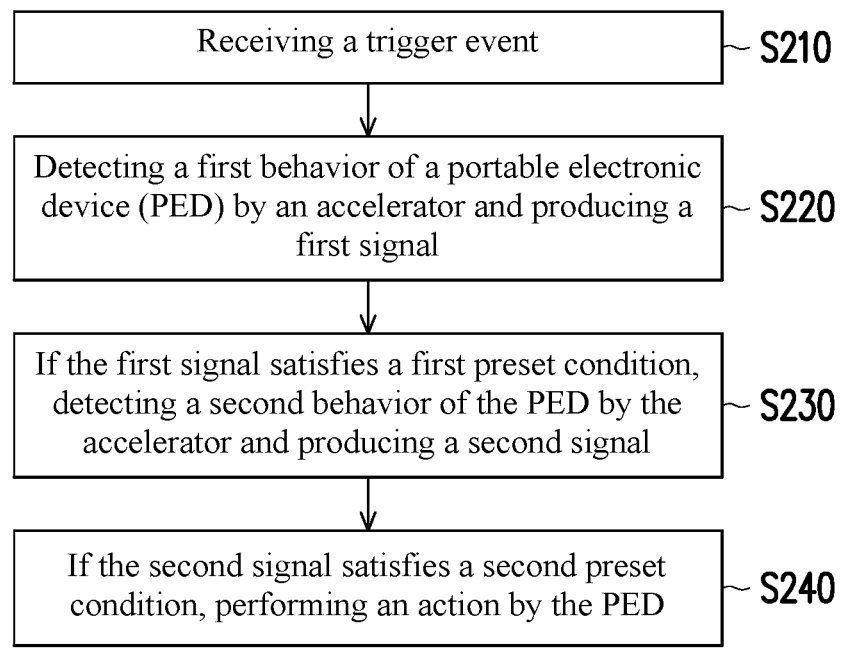
FIG. 2 is a flow chart illustrating a control method of a PED according to an embodiment of the invention.

FIG. 2 is a flow chart illustrating a control method of a PED according to an embodiment of the invention. Referring to FIG. 1A, FIG. 1B, and FIG. 2, in step S210, when a trigger event is received by the PED 100, the operation controller 140 is awakened. In step S210, one of the trigger events may be a change amount of an instant displacement of the PED 100 in a three-dimensional space being greater than a default threshold value. Specifically, the change amount of the displacement may be defined as an absolute value obtained by subtracting an acceleration component in a static state (i.e., Xg, Yg, or Zg) or the sum of each acceleration component (Tg) from an acceleration component or the sum of each acceleration component of the instant displacement. If the change amount of the acceleration component is greater than 0.1 g, or the change amount of a sum of each acceleration component is greater than 0.3 g, the operation controller 140 is awakened. It is worth noting that the change amount of the acceleration component or the change amount of the sum of each acceleration component may be adjusted according to practical applications, and the invention is not limited hereto.

The PED further includes a trigger element 150, wherein the trigger element 150 may be a power button or a distance sensor disposed at the long side 121 of the body 120 and electrically coupled to the operation controller 140. The trigger element 150 is configured to detect whether the long side 121 of the body 120 touches the working plane 10. In step S210, another method for triggering an event is to trigger the trigger element 150. Therefore, when the long side 121 of the body 120 touches the working plane 10 and triggers the trigger element 150, the trigger element 150 transmits a trigger signal to the operation controller 140 so as to wake the operation controller 140.

After the operation controller 140 is awakened, the first behavior of the PED 100 is detected by the accelerator 130, and the first signal is produced (step S220), wherein the first signal is, for example, Tg. Moreover, the first signal is transmitted to the operation controller 140. Specifically, the first behavior may be the PED 100 being oscillated, or the long side 121 of the body 120 being touched or tapped. After the first signal is transmitted to the operation controller 140, the first signal is compared or determined by the operation controller 140, so as to ensure whether the first signal satisfies the first preset condition. Before the PED 100 falls into a static state, a value of each acceleration component or the sum of the acceleration component continues to change, and thus a corresponding pulse signal converted according to a variation of the acceleration component or a variation of the sum of the acceleration component may be obtained.

Figure 3:
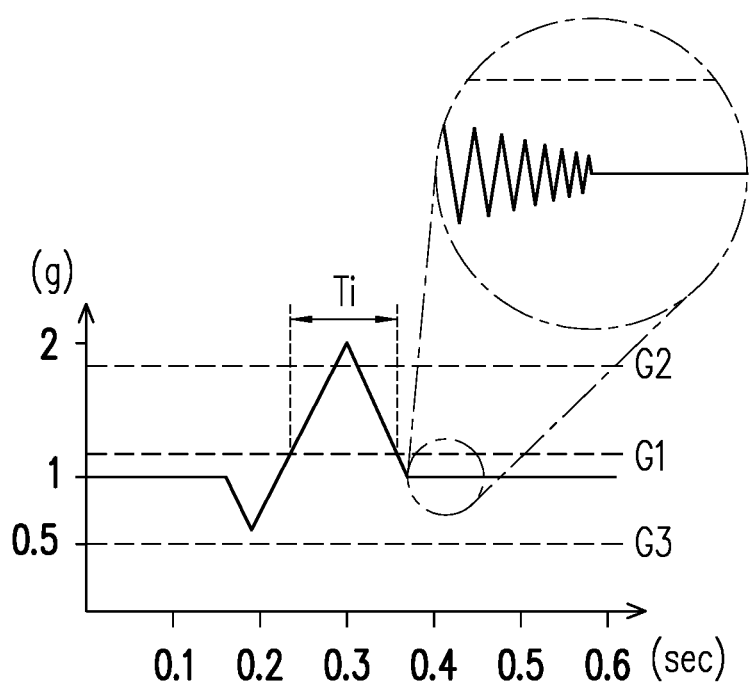
FIG. 3 is a pulse diagram illustrating a first signal according to an embodiment of the invention.

FIG. 3 is a pulse diagram illustrating the first signal according to an embodiment of the invention. In FIG. 3, the horizontal axis is time (unit: second), the vertical axis is the acceleration (unit: g), and a horizontal section of the pulse corresponds to 1 g. Referring to FIG. 3, when the PED 100 falls from the air, the pulse descends from the horizontal section and approaches the third threshold value G3 but does not exceed the third threshold G3, wherein the third threshold G3 is approximately 0.5 g. Next, when the long side 121 of the body 120 touches the working plane 10, the pulse moves upward from a low point and passes through the horizontal section. Once the pulse conforms to the above waveform, it indicates that the long side 121 of the body 120 touches a soft object. On the contrary, if the pulse descends and exceeds the third threshold value G3, a fail event is then defined, and the following detection or determination step is halted to prevent the PED 100 from performing a turning-on/off function or a switching function when the PED 100 is hit heavily or touched accidentally.

Next, the pulse continues to ascend from the horizontal section and exceeds the first threshold value G1, and then the pulse continues to ascend and break through the second threshold value G2, wherein the first threshold value G1 falls between approximately 1.1 g and 1.2 g, the second threshold value G2 falls between approximately 1.6 g and 1.7 g, and a peak value (i.e., the highest point) of the pulse falls between approximately 1.6 g and 3 g. If the peak value of the pulse exceeds 3 g, a fail event is defined. Afterwards, the pulse descends from the high point, passes through the second threshold value G2 and the first threshold value G1, and returns to the horizontal section. Referring to the partial enlarged view of FIG. 3, the pulse practically moves back to the horizontal section in the manner shown by the gradually fading and oscillating waveform. A time cycle Ti during which the pulse passes through the first threshold value G1, ascends to the high point, and then descends to the first threshold value G1 falls between approximately 10 milliseconds to 80 milliseconds. Simply put, the time cycle Ti may be defined as a time period between a pulse ascending and descending to pass through two first threshold values G1. When a time period during which, on a horizontal basis, a pulse signal of the first signal ascends to and exceeds the first threshold value G1 and the second threshold value G2 and descends to the first threshold value G1 satisfies the time cycle Ti, the first signal satisfies the first preset condition. That is to say, a variation of the first threshold value G1, the second threshold value G2, the third threshold value G3, the time cycle Ti, and the pulse is the first preset condition provided in the embodiment.

It is noted that length of the time cycle Ti is conducive to identifying a touching or oscillation behavior. The first threshold value G1 is configured to define the time cycle Ti, and on the other hand, when the accelerator 130 detects an acceleration speed exceeds the first threshold value G1, the accelerator records all the detected acceleration values, so as to convert the acceleration values into a pulse diagram. The second threshold value G2 may be used to identify the strength (force) of the touch, while the first threshold value G1 and the time cycle Ti collaboratively determine the difference between the touch and the oscillation. The numeral ranges of the first threshold G1, the second threshold G2, the third threshold G3, the time cycle Ti, and etc. may all be adjusted according to actual application, and the invention is not limited thereto. On the other hand, the greater the hardness of the working plane 10 touched by the PED 100 is, the shorter the time cycle Ti is, and once the time cycle Ti falls near the shortest sample cycle of the accelerator, the acquired pulse is distorted; nonetheless, the distortion may be filtered out by the pulse comparison or determination as mentioned above.

In some other embodiments, if an initial state of the PED 100 is to be disposed on the working plane 10, once the PED 100 is moved away from the working plane 10, the pulse may ascend slightly from the horizontal section, and the waveform is, for example, a gentle curve. Next, after the PED 100 falls down and the long side 121 of the body 120 touches the working plane 10, the waveform of the pulse approximately matches that depicted in FIG. 3.

Referring to FIG. 2, in step S230, if the operation controller 140 determines that the first signal satisfies the first preset condition, then the first behavior represents that the body 120 is touched, e.g., the body 120 touches a soft object. In other embodiments, a cushion (i.e., a rubber) may be disposed at the peripheries of the body 120, and if the operation controller 140 determines the first signal satisfies the first preset condition, then the first behavior refers to the body 120 being touched, e.g., the cushion around the body 120 touches a hard or soft object. Next, the second behavior of the PED 100 is detected by the accelerator 130, and the second signal (e.g., Tg) is produced. Moreover, the second signal is transmitted to the operation controller 140. On the contrary, if the operation controller 140 determines the first signal does not satisfy the first preset condition, the first behavior is determined to be the body 120 being shaken, and the following detection or determination step is thus halted.

Figure 4:
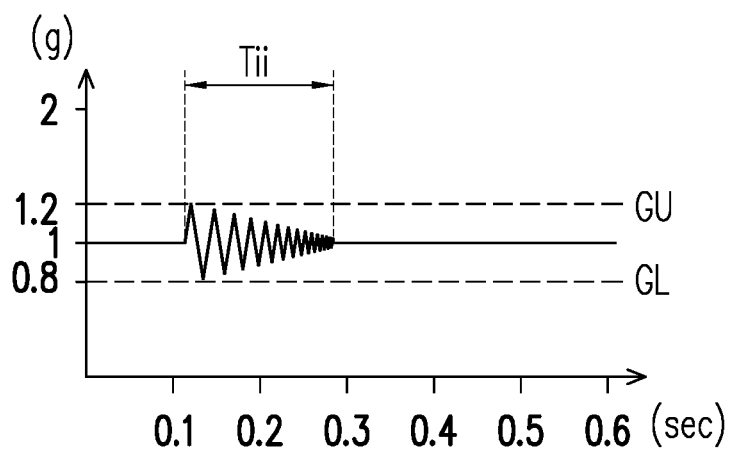
FIG. 4 is a pulse diagram illustrating a second signal according to an embodiment of the invention.

FIG. 4 is a pulse diagram illustrating the second signal according to an embodiment of the invention, wherein the horizontal axis of FIG. 4 refers to time (unit: second), and the vertical axis refers to acceleration (unit: g). Referring to FIG. 4, if the pulse oscillates back and forth between a lower limit value GL and an upper limit value GU, or if the number of times of the pulse exceeding the lower limit value GL and the upper limit value GU falls within a predetermined number of times, it indicates that the PED 100 is close to a static state (i.e., the second signal satisfies the second preset condition). The predetermined number of times may be approximately 30, the lower limit value and the upper limit value may be 0.8 g and 1.2 g, respectively, and the time cycle Tii is, for example, equal to or shorter than 0.2 seconds. The predetermined number of times, the lower limit value GL, the upper limit value GU, the time cycle Tii, and the limited number of times the pulse exceeding the lower limit value GL and the upper limit value GL are the second preset condition according to the embodiment. It is noted that the numeral ranges of the lower value GL, the upper value GU, the time cycle Tii, and the limited number of times the pulse exceeding the lower value GL and the upper value GU may be adjusted according to practical application, and the invention is not limited hereto.

Also referring to FIG. 2, in step S240, if the operation controller 140 determines the second signal satisfies the second preset condition, then the second behavior indicates that the body 120 is in a static state. At this time, the PED 100 executes an action. The action includes a power source turning-on/off function, a software program turning-on/off function, a mechanism turning-on/off function, or other turning-on/off functions or a volume switching function, a screen switching function, a software program switching function, or other switching functions. When executing the power source turning-on/off function, other turning on/off functions, the volume switching function, the screen switching function, or other switching functions, the PED 100 transmits a turning-on/off signal or a switching signal to a corresponding firmware unit through the operation controller 140. On the contrary, if the operation controller 140 determines the second signal does not satisfy the second preset condition, it is determined that the body 120 is not in a static state, the following steps, such as the turning-on/off function, the switching function, or etc., are halted.

On the other hand, the operation controller 140 in a study mode records different operation actions and steps of a user as well as the turning-on/off functions or the switching functions corresponding to the various operation actions and steps. Therefore, when a certain operation action and step are executed on the PED 100, the operation controller 140 automatically detects a turning-on/off function or switching function that should be performed, which not only prevents the complicated determination mechanism but also facilitates the operation for the user.

Figure 5A:
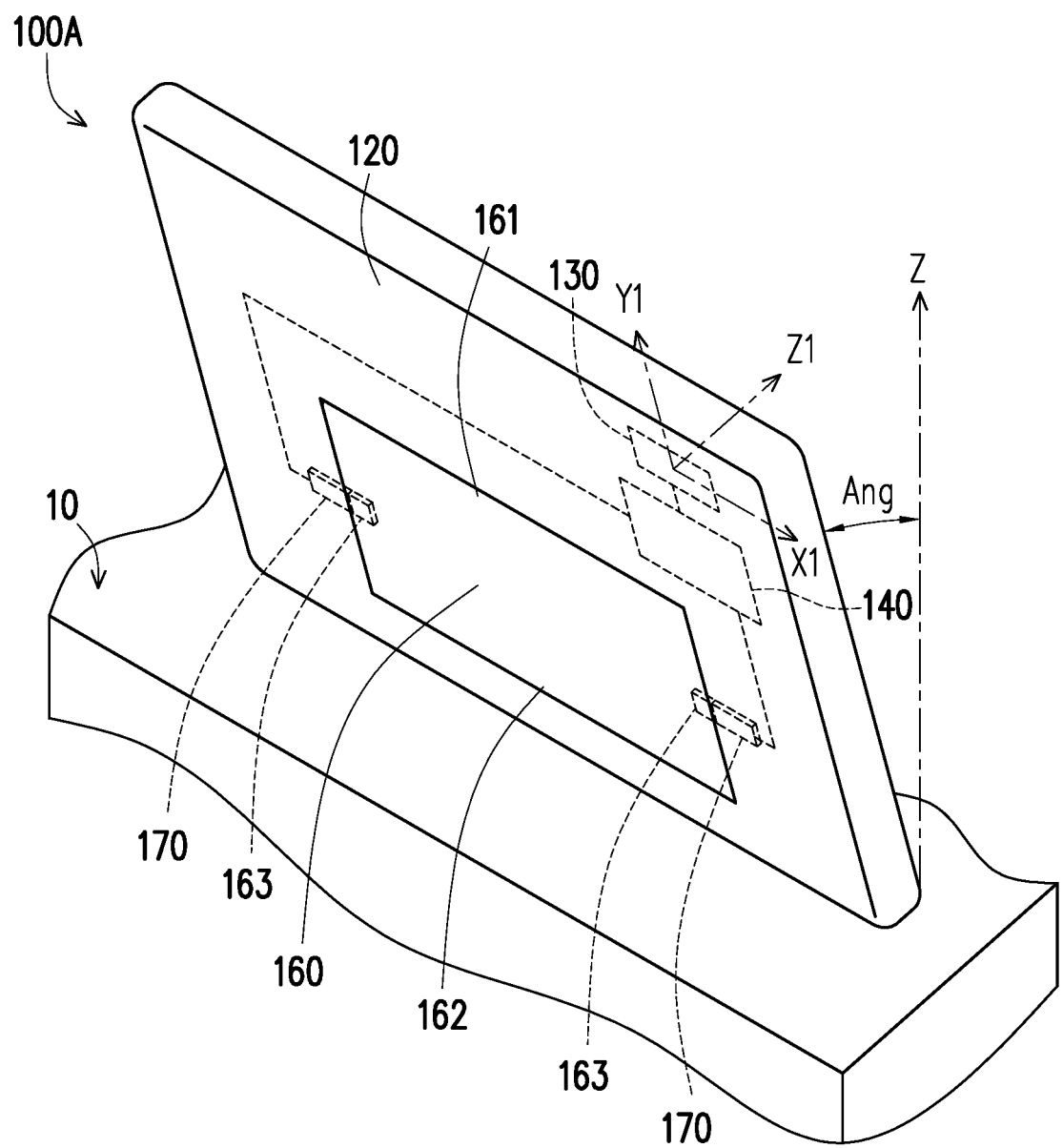
FIG. 5A and FIG. 5B are schematic diagrams respectively illustrating a usage situation of a PED according to another embodiment of the invention.
Figure 5B:
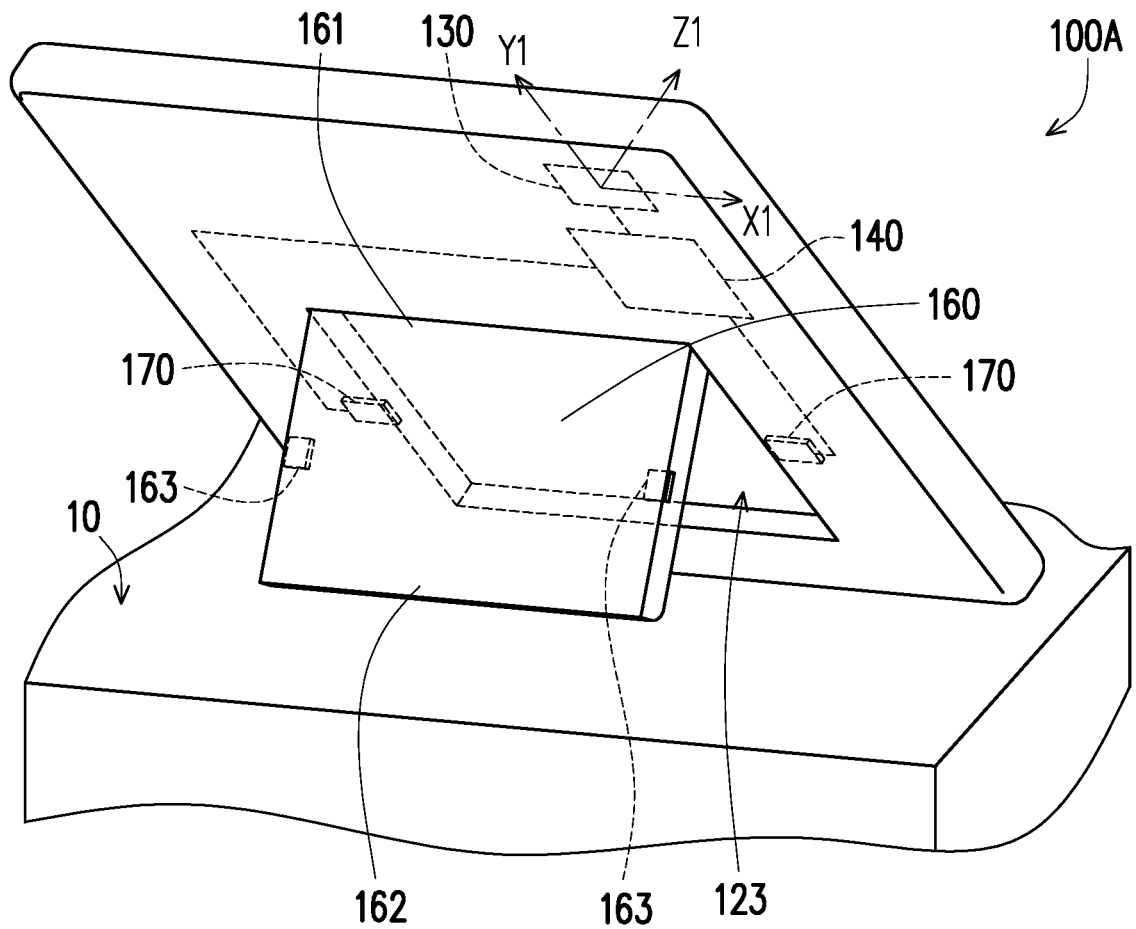
Figure 6:
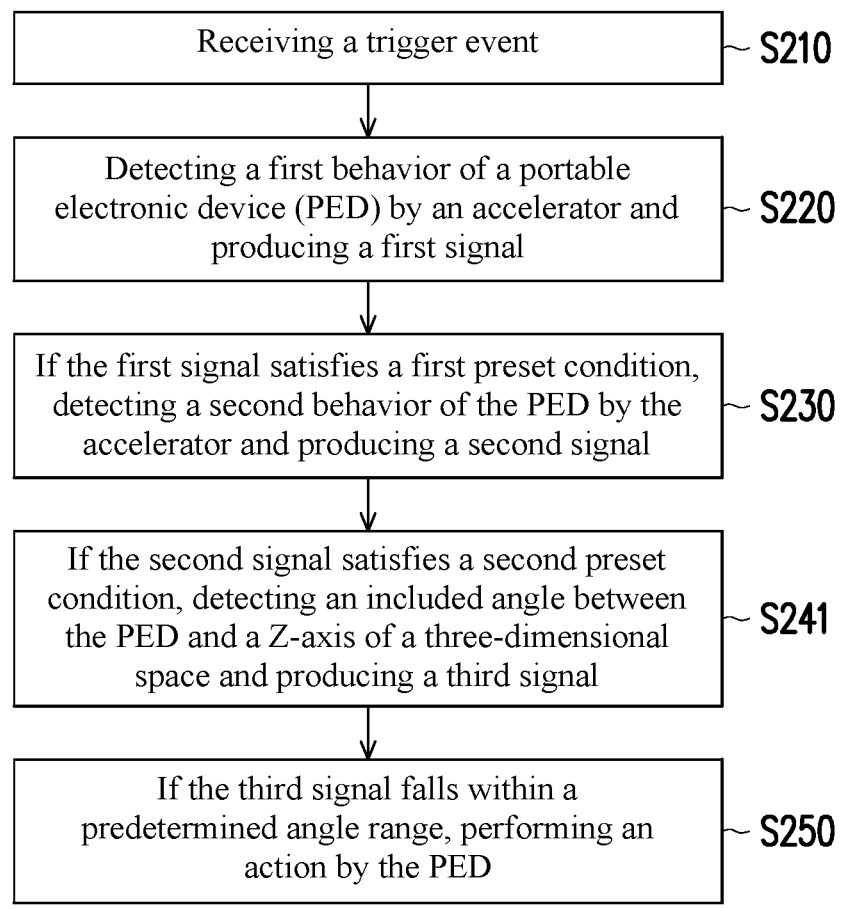
FIG. 6 is a flow chart illustrating a control method of a PED according to another embodiment of the invention.

FIG. 5A and FIG. 5B are schematic diagrams respectively illustrating a usage situation of a PED according to another embodiment of the invention. FIG. 6 is a flow chart illustrating a control method of a PED according to another embodiment of the invention. A turning-on/off function of unfolding a support stand 160 against the body 120 is described below. The determination flow chart illustrated in FIG. 6 and the determination flow chart illustrated in FIG. 2 are similar, and only differences between the two charts are provided below. Referring to FIG. 5A, FIG. 5B, and FIG. 6, the PED 100A further includes the support stand 160 and a position-limiting 170 in the embodiment. The body 120 has an accommodation chamber 123 configured to store the support stand 160. The support stand 160 has a corresponding pivotal end 161 and an active end 162, wherein the support stand 160 is pivoted to the body 120 through the pivotal end 161, such that the support stand 160 is able to rotate relative to the body 120. The position-limiting element 170 is disposed at the body 120 and corresponds to the support stand 160, and the position-limiting element 170 is engaged with the support stand 160, such that the support stand 160 is stored at the body 120 (that is, the support stand 160 is stored inside the accommodation chamber 123.)

Specifically, the support stand 160 has a buckling part 163, for example, a slot, corresponding to the position-limiting element 170. The position-limiting element 170 is inserted through the buckling part 163, such that the support stand 160 is fixed into the accommodation chamber 123. In the embodiment, a material of the position-limiting element 170 comprises a memory alloy and the position-limiting element 170 is electrically coupled to the operation controller 140. It is worth noting that the type of structure of the buckling part is not limited in the invention, while in some other embodiments, the buckling part may be a hook or other applicable parts. On the other hand, the types of the support stand and the position-limiting element may be adjusted according to practical applications and are not limited to what are shown in the drawings.

The difference between the determination flow chart of FIG. 6 and the determination flow chart of FIG. 2 lies in that in step S241, if the operation controller 140 determines the second signal satisfies the second preset condition, an included angle Ang between the PED 100 and a Z-axis of a three-dimensional space is detected by the accelerator 130, and the third signal is produced. Moreover, the third signal is transmitted to the operation controller 140. In step S250, if the operation controller 140 determines the third signal falls within a default angle range (e.g., 20 degrees), the PED 100 then executes the turning-on/off function or the switching function. Here, when the PED 100 executes the turning-on/off function, the operation controller 140 electrifies to the position-limiting element 170, such that the position-limiting element 170 is deformed. At this time, the position-limiting element 170 is shortened owing to temperature increase, moved out of the buckling part 163, and separated from the support stand 160. Therefore, the support stand 160 is unfolded against the body 120 and in contact with the working plane 10 through the active end 162, such that the PED 100 stands on the working plane 10 through the support stand 160. It is worth noting that the numeral range of the predetermined angle range may be adjusted according to practical applications, and the invention is not limited hereto.

Overall, the PED provided in the invention is equipped with the operation controller and the accelerator, wherein the behavior or status of the PED is detected by the accelerator, the determination mechanism or model is set up by the operation controller, and after the signal detected by the accelerator is determined to satisfy the preset condition, the PED may immediately execute the power source turning-on/off function, the software program turning-on/off function, the mechanism turning-on/off function, or other turning-on/off functions or execute the volume switching function, the screen switching function, the software program switching function, or other switching functions. In other words, the PED and the control method provided by an embodiment of the invention allow a user to execute the turning-on/off function or the switching function more rapidly with no need to operate on a physical button or a virtual button, and operation is facilitated as a result.

It will be apparent to those skilled in the art that various modifications and variations can be made to the disclosed embodiments without departing from the scope or spirit of the invention. In view of the foregoing, it is intended that the invention covers modifications and variations provided that they fall within the scope of the following claims and their equivalents.

What is claimed is:

1. A control method of a portable electronic device (PED), comprising:
   receiving a trigger event;
   detecting a first behavior of the PED by an accelerator and producing a first signal;
   detecting a second behavior of the PED by the accelerator if the first signal satisfies a first preset condition, and producing a second signal; and
   performing an action by the PED if the second signal satisfies a second present condition,
   wherein the first preset condition comprises a first threshold value, a second threshold value, a peak threshold value, and a time cycle, the second threshold value is greater than the first threshold value, the peak threshold value is greater than the second threshold value,
   when a time period during which a pulse signal of the first signal ascends to and exceeds the first threshold value and the second threshold value and descends to the first threshold value satisfies the time cycle, the first signal satisfies the first preset condition, and
   when the pulse signal of the first signal exceed the peak threshold value, a fail event is defined.

2. The control method of the PED as claimed in claim 1, wherein the trigger event comprises a displacement of the PED, and a change amount of an acceleration component or the change amount of a sum of the acceleration component in a three-dimensional coordinate detected by the accelerator is greater than a default threshold value.

3. The control method of the PED as claimed in claim 1, wherein the PED comprises a trigger element, and the trigger event comprises triggering the trigger element.

4. The control method of the PED as claimed in claim 1, further comprising following steps after determining the second signal satisfies the second present condition:
   detecting an included angle between the PED and a Z-axis of a three-dimensional space by the accelerator, and producing a third signal; and
   performing the action by the PED if the third signal falls within a default angle range.

5. The control method of the PED as claimed in claim 1, wherein the first behavior refers to the PED being touched, and the second behavior refers to the PED in a static state.

6. The control method of the PED as claimed in claim 1, wherein the second preset condition comprises a lower limit value and an upper limit value, and when a pulse signal of the second signal oscillates back and forth between the lower limit value and the upper limit value, or the number of times of the pulse signal exceeding the lower limit value and the upper limit value falls within a predetermined number of times, the second signal satisfies the second preset condition.

7. The control method of the PED as claimed in claim 6, wherein the pulse signal of the first signal and the pulse signal of the second signal are converted according to a variation of an acceleration component or a variation of a sum of the acceleration component in a three-dimensional coordinate detected by the accelerator, respectively.

8. The control method of the PED as claimed in claim 1, wherein the action comprises turning on or off a mechanism.

9. The control method of the PED as claimed in claim 1, wherein the action comprises turning on or off a power source, a software program, a volume or a screen, or switching between the power source, the software program, the volume and the screen.

10. A PED, comprising:
    a body;
    an accelerator, disposed at the body and detecting a first behavior and a second behavior of the body, so as to produce a first signal and a second signal, respectively; and
    an operation controller, disposed at the body and electrically coupled to the accelerator, wherein the operation controller is awaken by a trigger event to receive the first signal and the second signal, and if the operation controller determines the first signal satisfies a first preset condition and the second signal satisfies a second preset condition, the PED performs an action,
    wherein the first preset condition comprises a first threshold value, a second threshold value, a peak threshold value, and a time cycle, the second threshold value is greater than the first threshold value, the peak threshold value is greater than the second threshold value,
    when a time period during which a pulse signal of the first signal ascends to and exceeds the first threshold value and the second threshold value and descends to the first threshold value satisfies the time cycle, the first signal satisfies the first preset condition, and
    when the pulse signal of the first signal exceed the peak threshold value, a fail event is defined.

11. The PED as claimed in claim 10, wherein the trigger event comprises a displacement of the PED, and a change amount of an acceleration component or the change amount of a sum of the acceleration component in a three-dimensional coordinate detected by the accelerator is greater than a default threshold value.

12. The PED as claimed in claim 10, further comprising:
    a trigger element, disposed at one side of the body, wherein the trigger element is electrically coupled to the operation controller, and the trigger event comprises triggering the trigger element.

13. The PED as claimed in claim 10, wherein the accelerator further detects an included angle between the PED and a Z-axis in a three-dimensional space and transmits a detected third signal to the operation controller, and if the operation controller determines the third signal falls into a predetermined angle range, the operation controller then makes the PED to perform a turning-on/off function or a switching function.

14. The PED as claimed in claim 13, further comprising:
    a support stand, movably connected to the body; and
    a position-limiting element, disposed at the body and corresponding to the support stand, wherein the position-limiting element is engaged with the support stand, such that the support stand is stored at the body, and the turning-on/off function comprises separating the position-limiting element from the support stand, such that the support stand is unfolded against the body.

15. The PED as claimed in claim 14, wherein a material of the position-limiting element comprises a memory alloy and the position-limiting element is electrically coupled to the operation controller, and when the PED performs a turning-on/off function, the operation controller electrifies the position-limiting element, such that the position-limiting element is deformed and separated from the support stand.

16. The PED as claimed in claim 10, wherein the first behavior refers to the body being touched, and the second behavior refers to the body being in a static state.

17. The PED as claimed in claim 10, wherein the second preset condition comprises a lower limit value and an upper limit value, and when a pulse signal of the second signal oscillates back and forth between the lower limit value and the upper limit value, or the number of times of the pulse signal exceeding the lower limit value and the upper limit value falls within a predetermined number of times, then the second signal satisfies the second preset condition.

18. The PED as claimed in claim 17, wherein the pulse signal of the first signal and the pulse signal of the second signal are converted according to a variation of an acceleration component or a variation of a sum of the acceleration component in a three-dimensional coordinate detected by the accelerator, respectively.

19. The PED as claimed in claim 10, wherein the action comprises turning on or off a mechanism.

20. The PED as claimed in claim 10, wherein the action comprises turning on or off a power source, a software program, a volume or a screen, or switching between the power source, the software program, the volume and the screen.

* * * * *